(12) United States Patent
Carr et al.

(10) Patent No.: US 7,660,112 B2
(45) Date of Patent: Feb. 9, 2010

(54) COMPONENT BAY

(75) Inventors: Daniel S. Carr, Round Rock, TX (US);
Bradley A. Jackson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 11/745,509

(22) Filed: May 8, 2007

(65) Prior Publication Data

US 2008/0278904 A1 Nov. 13, 2008

(51) Int. Cl.
*G06F 1/16* (2006.01)
(52) U.S. Cl. ............... 361/679.58; 361/679.32; 361/679.33; 312/223.1; 312/223.2
(58) Field of Classification Search ........... 361/679, 361/683, 685, 724–730, 679.32, 679.36, 361/679.58; 312/223.1, 223.2, 333
See application file for complete search history.

(56) References Cited

U.S. PATENT DOCUMENTS

| | | | | | |
|---|---|---|---|---|---|
| 4,688,864 | A | * | 8/1987 | Sorel | 439/74 |
| 5,124,886 | A | * | 6/1992 | Golobay | 361/727 |
| 5,604,662 | A | * | 2/1997 | Anderson et al. | 361/685 |
| 5,788,211 | A | * | 8/1998 | Astier | 248/674 |
| 5,853,091 | A | * | 12/1998 | Luenser | 211/40 |
| 6,018,456 | A | | 1/2000 | Young et al. | |
| 6,075,694 | A | * | 6/2000 | Mills et al. | 361/685 |
| 6,112,910 | A | * | 9/2000 | Baxter | 211/40 |
| 6,272,008 | B1 | * | 8/2001 | Huang | 361/683 |
| 6,301,105 | B2 | * | 10/2001 | Glorioso et al. | 361/685 |
| 6,317,318 | B1 | * | 11/2001 | Kim | 361/685 |
| 6,392,892 | B1 | * | 5/2002 | Sobolewski et al. | 361/724 |
| 6,430,644 | B1 | * | 8/2002 | Luen et al. | 710/300 |
| 6,580,606 | B1 | * | 6/2003 | Leman | 361/685 |
| 6,760,218 | B2 | * | 7/2004 | Fan | 361/679.02 |
| 6,905,374 | B2 | | 6/2005 | Milan | |
| 6,906,918 | B2 | | 6/2005 | Rabinovitz | |
| 6,920,042 | B2 | * | 7/2005 | Yuan et al. | 361/685 |
| 7,190,574 | B2 | * | 3/2007 | Muenzer et al. | 361/679.32 |
| 2001/0006453 | A1 | * | 7/2001 | Glorioso et al. | 361/685 |
| 2003/0058622 | A1 | * | 3/2003 | Sim et al. | 361/725 |
| 2004/0100763 | A1 | * | 5/2004 | Yuan et al. | 361/685 |
| 2004/0173544 | A1 | * | 9/2004 | Chen | 211/26 |
| 2005/0270751 | A1 | * | 12/2005 | Coglitore et al. | 361/724 |
| 2008/0144271 | A1 | * | 6/2008 | Hartman et al. | 361/685 |

\* cited by examiner

*Primary Examiner*—Jayprakash N Gandhi
*Assistant Examiner*—Anthony Q Edwards
(74) *Attorney, Agent, or Firm*—Haynes and Boone, LLP

(57) ABSTRACT

A component bay system includes a first component bay having a first bay chassis coupling member and first bay stacking member. The system also includes a second component bay having a second bay chassis coupling member. The first bay chassis coupling member is operable to couple to a chassis by engaging the chassis. The second bay chassis coupling member is operable to couple to either of the chassis, by engaging the chassis, and to the first component bay, by engaging the first bay stacking member. In an embodiment, the first component bay and the second component bay are identical and allow the component bay system to be added to a chassis to support multiple configurations for modular components.

5 Claims, 11 Drawing Sheets

COMPONENT BAY

BACKGROUND

The present disclosure relates generally to information handling systems, and more particularly to a component bay for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Typical IHSs include an IHS chassis that houses some or all of the components of the IHS. To lower cost and simplify manufacturing, the IHS chassis may be provided to be used across different IHS platforms. However, these different IHS platforms may require different numbers, orientations, and types of modular components such as, for example, hard drives. The positioning of these modular components in the IHS chassis raises a number of issues.

For example, an IHS chassis may be used for a first platform and a second platform, with the first platform requiring a plurality of first hard drives in a first location and orientation, and the second platform requiring a plurality of second hard drives in a second location and orientation. These differences in number, location, orientation, and type of hard drives may be driven by many factors such as, for example, thermal considerations, space consideration, the need to allow room for future component upgrades or reconfigurations, and a variety of other factors known in the art. Conventionally, a plurality of different hard drive bays are used to allow the hard drives to be coupled to the IHS chassis. For example, a first hard drive bay may be used in the IHS chassis for the first platform in order to couple a plurality of first hard drives to the IHS chassis in a particular location and orientation. A second hard drive bay then may be used in the IHS chassis for the second platform in order to couple a plurality of second hard drives to the IHS chassis in a particular location and orientation. The need for a plurality of different hard drive bays in order to allow the use of an IHS chassis across different platforms increases manufacturing time, complexity, and cost.

Accordingly, it would be desirable to provide an improved component bay.

SUMMARY

According to one embodiment, a component bay system includes a first component bay having a first bay chassis coupling member and first bay stacking member, a second component bay having a second bay chassis coupling member, wherein the first bay chassis coupling member is operable to couple to a chassis by engaging the chassis; and wherein the second bay chassis coupling member is operable to couple to either of the chassis, by engaging the chassis, and to the first component bay, by engaging the first bay stacking member.

BRIEF DESCRIPTION OF THE DRAWINGS

FIG. 2b is a bottom perspective view illustrating an embodiment of the first component bay of FIG. 2a.

FIG. 3a is a top perspective view illustrating an embodiment of a second component bay used with the first component bay of FIGS. 2a and 2b.

FIG. 3b is a bottom perspective view illustrating an embodiment of the second component bay of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
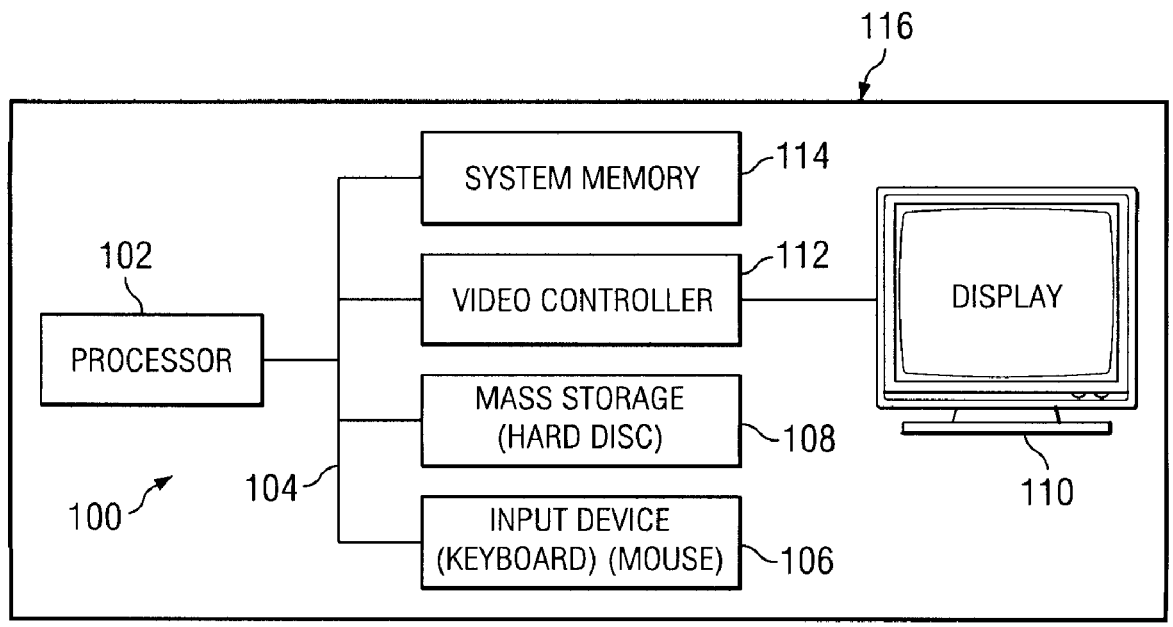
FIG. 1 is a schematic view of an embodiment of an IHS.
Figure 8A:
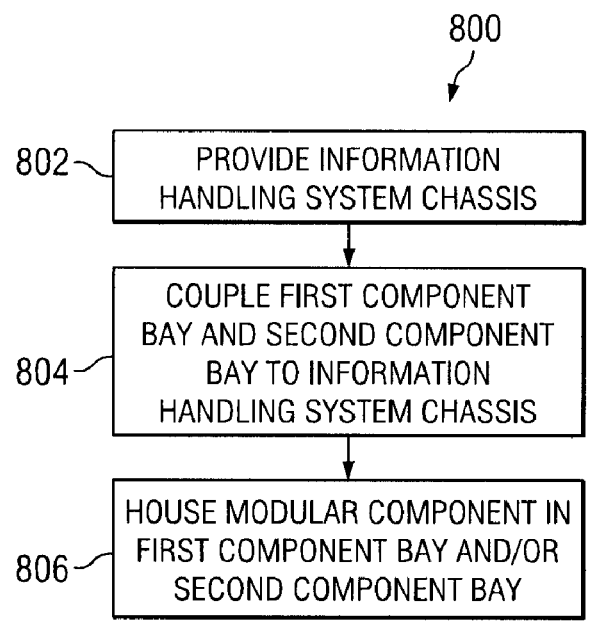
FIG. 8a is a flow chart illustrating an embodiment of a method for coupling a modular component to a chassis.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
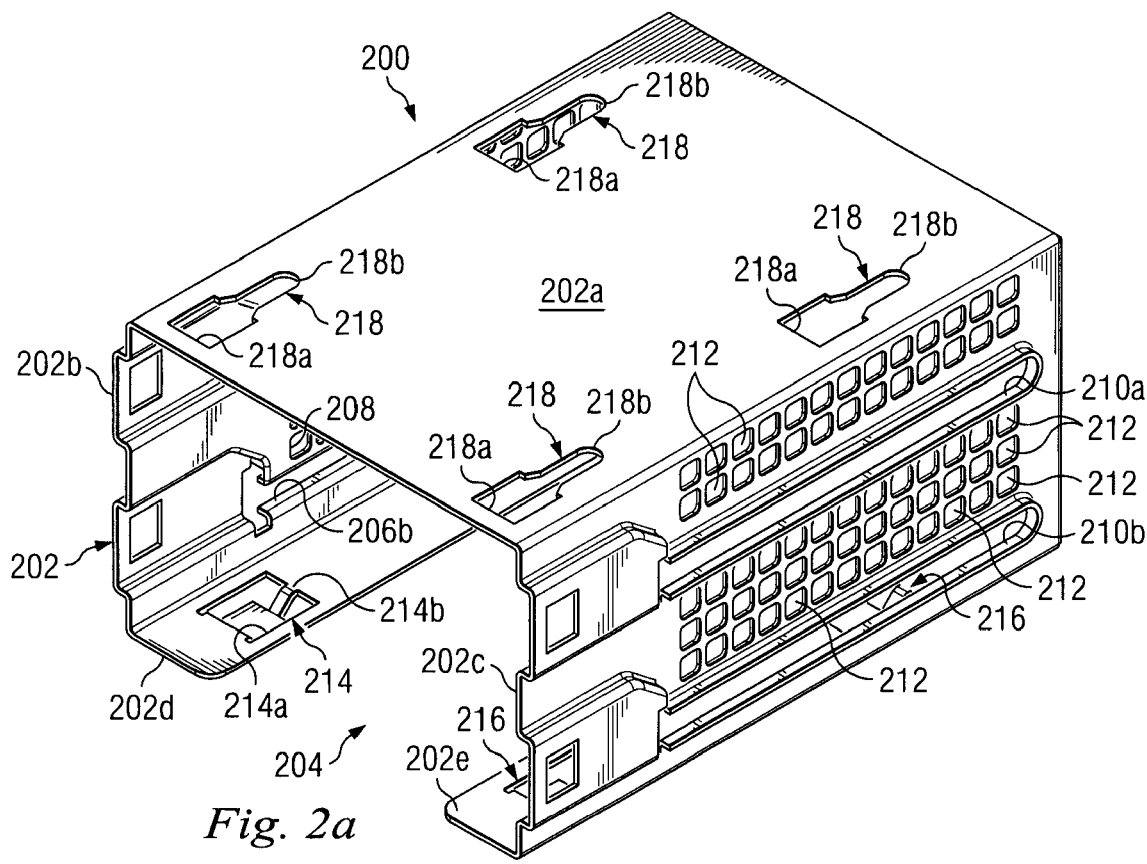
FIG. 2a is a top perspective view illustrating an embodiment of a first component bay.
Figure 2B:
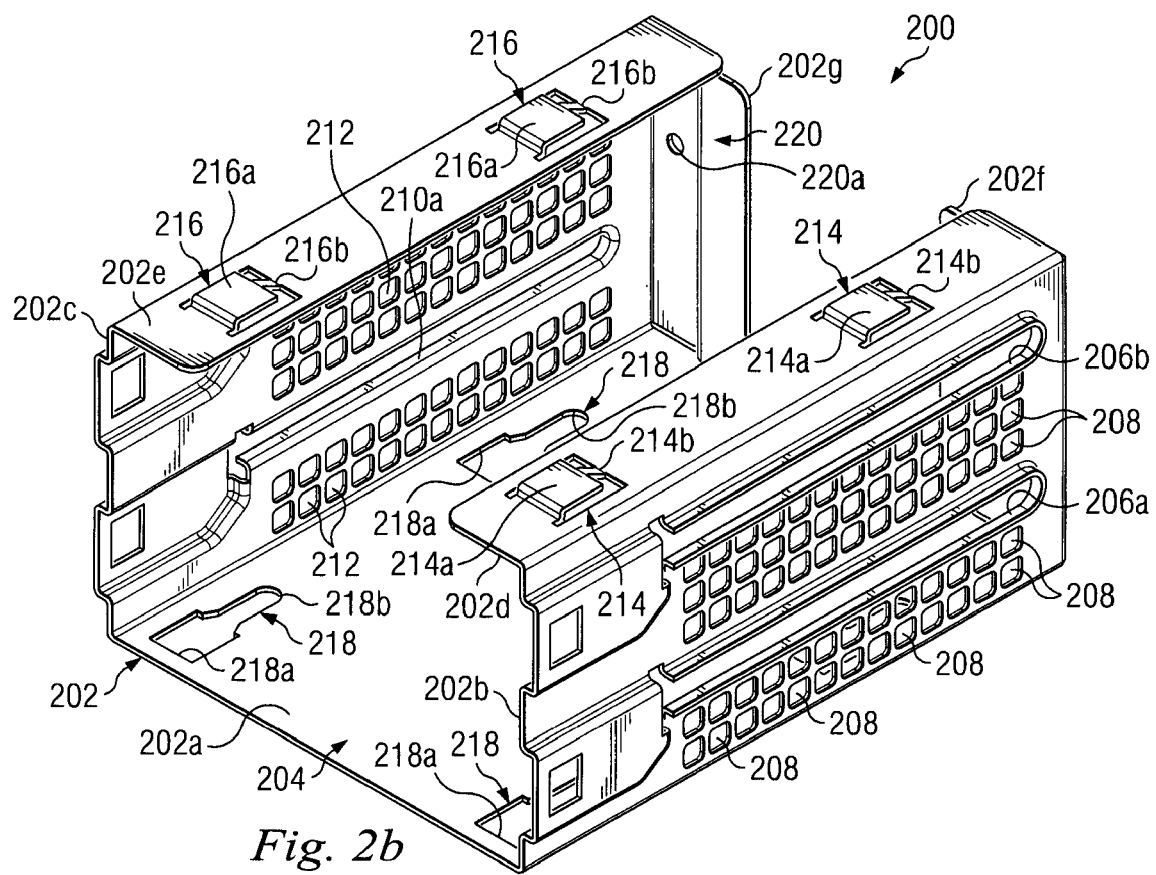

Referring now to FIGS. 2a and 2b, a first component bay 200 is illustrated. The first component bay 200 includes a base 202 having a top wall 202a, a plurality of side walls 202b and 202c extending from the top wall 202a in a substantially parallel and spaced apart relationship from each other, a bottom wall 202d extending from the side wall 202b, a bottom wall 202e extending from the side wall 202c, a rear wall 202f extending from the side wall 202b and the bottom wall 202d, and a rear wall 202g extending from the side wall 202b and the bottom wall 202e. A modular component housing 204 is defined by the base 202 between the top wall 202a, the side walls 202b and 202c, the bottom walls 202d and 202e, and the rear walls 202f and 202g. The side wall 202b defines a plurality of component channels 206a and 206b extending substantially along the length of the side wall 202b in a substantially parallel and spaced apart orientation from each other. The side wall 202b also defines a plurality of venting apertures 208 located adjacent the component channels 206a and 206b. The side wall 202c defines a plurality of component channels 210a and 210b extending substantially along the length of the side wall 202c in a substantially parallel and spaced apart orientation from each other. The side wall 202c also defines a plurality of venting apertures 212 located adjacent the component channels 206a and 206b. The bottom wall 202d includes a plurality of spaced apart first bay chassis coupling members 214 which, in the illustrated embodiment, each include a securing member 214a that extends from the bottom wall 202d and a guide member 214b extending between the securing member 214a and the bottom wall 202d. The bottom wall 202e includes a plurality of spaced apart first bay chassis coupling members 216 which, in the illustrated embodiment, each include a securing member 216a that extends from the bottom wall 202e and a guide member 216b extending between the securing member 216a and the bottom wall 202e. The top wall 202a includes a plurality of spaced apart first bay stacking members 218 which, in the illustrated embodiment, each include a locating aperture 218a defined by the top wall 202a and a securing channel 218b defined by the top wall 202a and extending from the locating aperture 218a. In an embodiment, the top wall 202a may include venting apertures similar to the venting apertures 208 and 212. The rear walls 202f and 202g each include a first bay securing member 220 (not shown on rear wall 202f) which, in the illustrated embodiment, includes a securing aperture 220a defined by the rear walls 202f and 202g.

Figures 3A, 3B:
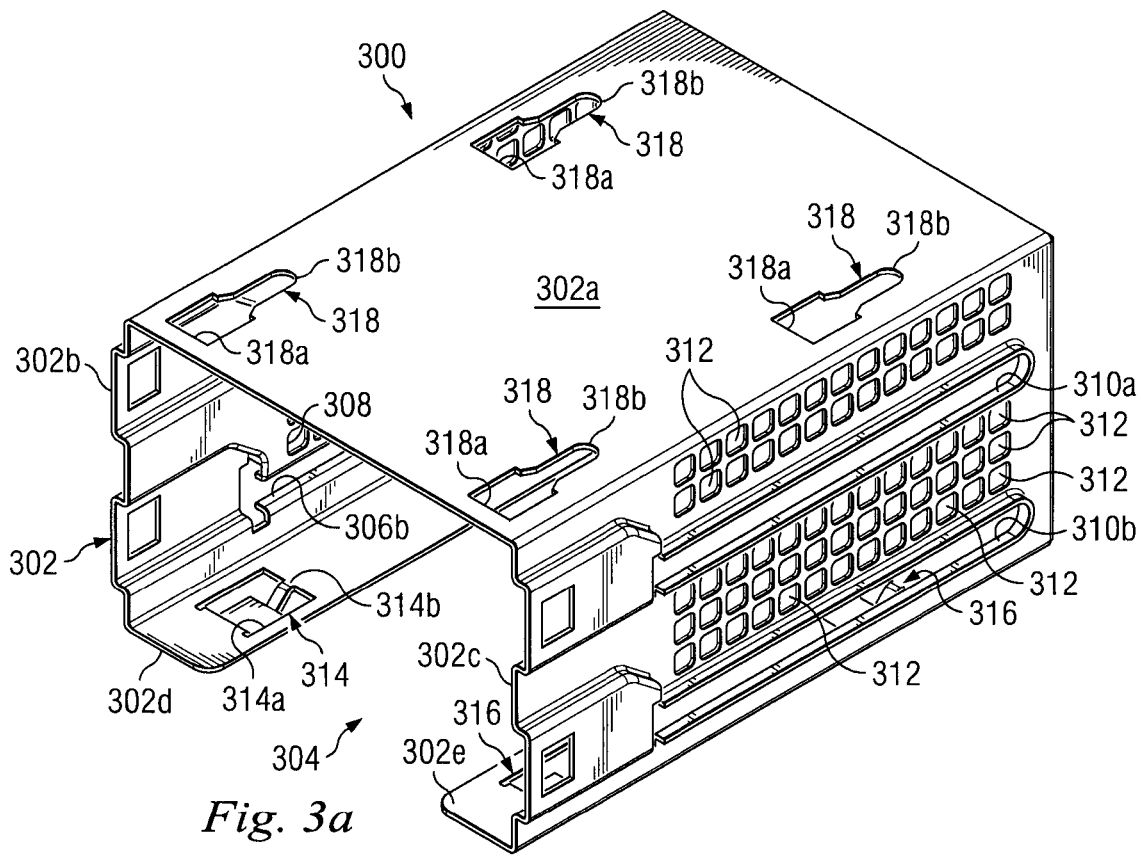

Referring now to FIGS. 3a and 3b, a second component bay 300 is illustrated. The second component bay 300 includes a base 302 having a top wall 302a, a plurality of side walls 302b and 302c extending from the top wall 302a in a substantially parallel and spaced apart relationship from each other, a bottom wall 302d extending from the side wall 302b, a bottom wall 302e extending from the side wall 302c, a rear wall 302f extending from the side wall 302b and the bottom wall 302d, and a rear wall 302g extending from the side wall 302b and the bottom wall 302e. A modular component housing 304 is defined by the base 302 between the top wall 302a, the side walls 302b and 302c, the bottom walls 302d and 302e, and the rear walls 302f and 302g. The side wall 302b defines a plurality of component channels 306a and 306b extending substantially along the length of the side wall 302b in a substantially parallel and spaced apart orientation from each other. The side wall 302b also defines a plurality of venting apertures 308 located adjacent the component channels 306a and 306b. The side wall 302c defines a plurality of component channels 310a and 310b extending substantially along the length of the side wall 302c in a substantially parallel and spaced apart orientation from each other. The side wall 302c also defines a plurality of venting apertures 312 located adjacent the component channels 306a and 306b. The bottom wall 302d includes a plurality of spaced apart second bay chassis coupling members 314 which, in the illustrated embodiment, each include a securing member 314a that extends from the bottom wall 302d and a guide member 314b extending between the securing member 314a and the bottom wall 302d. The bottom wall 302e includes a plurality of spaced apart second bay chassis coupling members 316 which, in the illustrated embodiment, each include a securing member 316a that extends from the bottom wall 302e and a guide member 316b extending between the securing member 316a and the bottom wall 302e. The top wall 302a includes a plurality of spaced apart second bay stacking members 318 which, in the illustrated embodiment, each include a locating aperture 318a defined by the top wall 302a and a securing channel 318b defined by the top wall 302a and extending from the locating aperture 318a. In an embodiment, the top wall 302a may include venting apertures similar to the venting apertures 308 and 312. The rear walls 302f and 302g each include a second bay securing member 320 (not shown on rear wall 302f) which, in the illustrated embodiment, includes a securing aperture 320a defined by the rear walls 302f and 302g. In the illustrated embodiment, the second component bay 300 has been illustrated as identical to the first component bay 200, described above with reference to FIGS. 2a and 2b. However, features on the second component bay 300 may be omitted such as, for example, the second bay stacking members 318.

Figure 4:
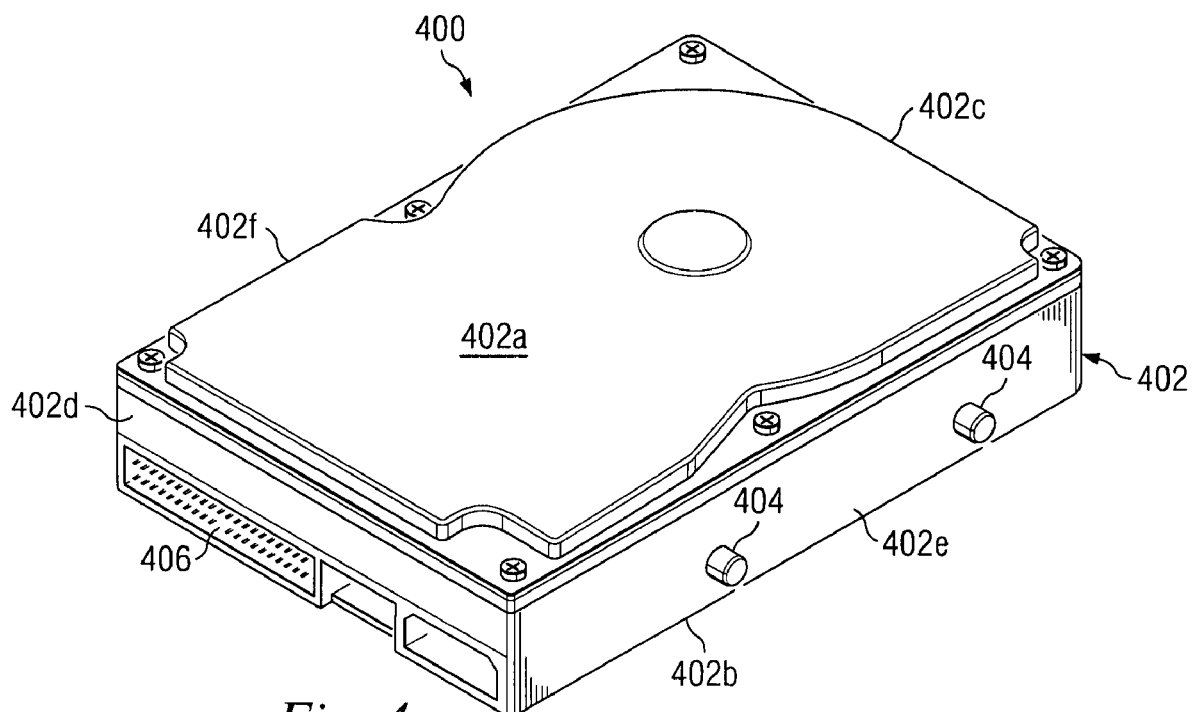
FIG. 4 is a perspective view illustrating an embodiment of a modular component used with the first component bay of FIGS. 2a and 2b and the second component bay of FIGS. 3a and 3b.
Figure 6A:
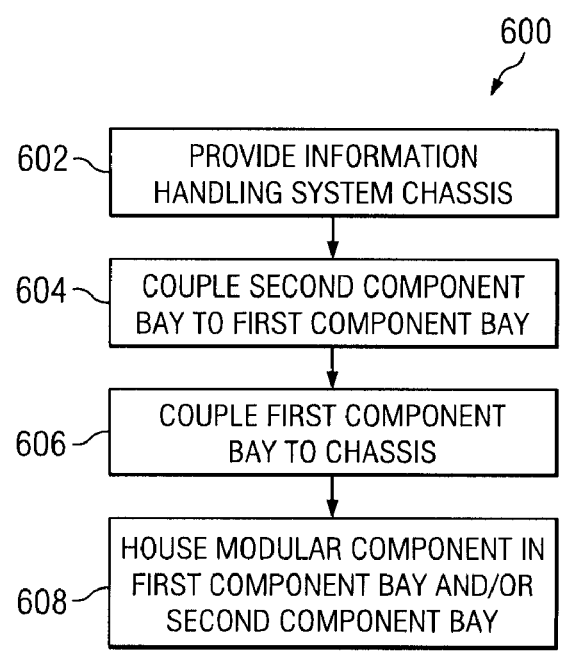
FIG. 6a is a flow chart illustrating an embodiment of a method for coupling a modular component to a chassis.

Referring now to FIG. 4, a modular component 400 is illustrated. The modular component 400 includes a base 402 having a top surface 402a, a bottom surface 402b located opposite the top surface 402a, a front surface 402c extending between the top surface 402a and the bottom surface 402b, a rear surface 402d located opposite the front surface 402c and extending between the top surface 402a and the bottom surface 402b, and a pair of opposing side surfaces 402e and 402f extending between the top surface 402a, the bottom surface 402b, the front surface 402c, and the rear surface 402d. A pair of guide members 404 extend from each of the side surface 402e and the side surface 402f (not shown on side surface 402f). An IHS connector 406 extends from the rear surface 402d. In an embodiment, the modular component 400 may be, for example, a hard disk drive, an optical drive, a tape drive, and/or a variety of other modular components known in the art. Furthermore, any modular components not presently know but later discovered may replace the modular component 400 and still fall within the scope of the present disclosure.

Figure 5:
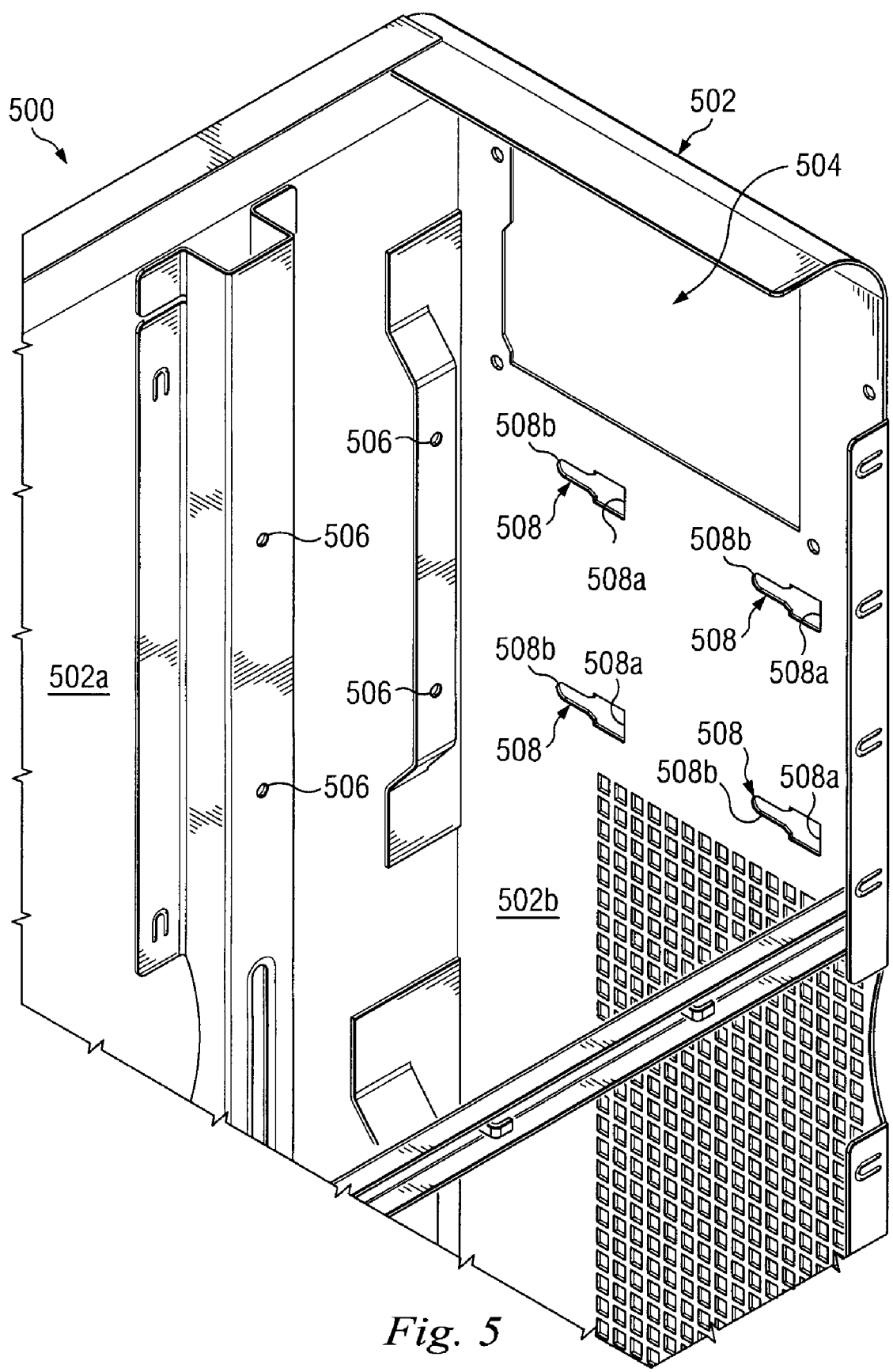
FIG. 5 is a perspective view illustrating an embodiment of an IHS chassis used with the first component bay of FIGS. 2a and 2b, the second component bay of FIGS. 3a and 3b, and the modular component of FIG. 4.

Referring now to FIG. 5, an IHS chassis 500 is illustrated. The IHS chassis 500 may be, for example, the chassis 116, described above with reference to FIG. 1, and may house some or all of the components of the IHS 100, described above with reference to FIG. 1. The IHS chassis 500 includes a base 502 having a side wall 502a and a rear wall 502b extending substantially perpendicularly from the side wall 502a. An IHS housing 504 is defined by the base 502 between the side wall 502a and the rear wall 502b. A plurality of securing apertures 506 are defined by the side wall 502a and located on the side wall 502a in a spaced apart orientation from each other. A plurality of bay coupling members 508 are located on the rear wall 502b that, in the illustrated embodiment, each include a locating aperture 508a defined by the rear wall 502b and a securing channel 508b defined by the rear wall 502b and extending from the locating aperture 508a.

Figure 6B:
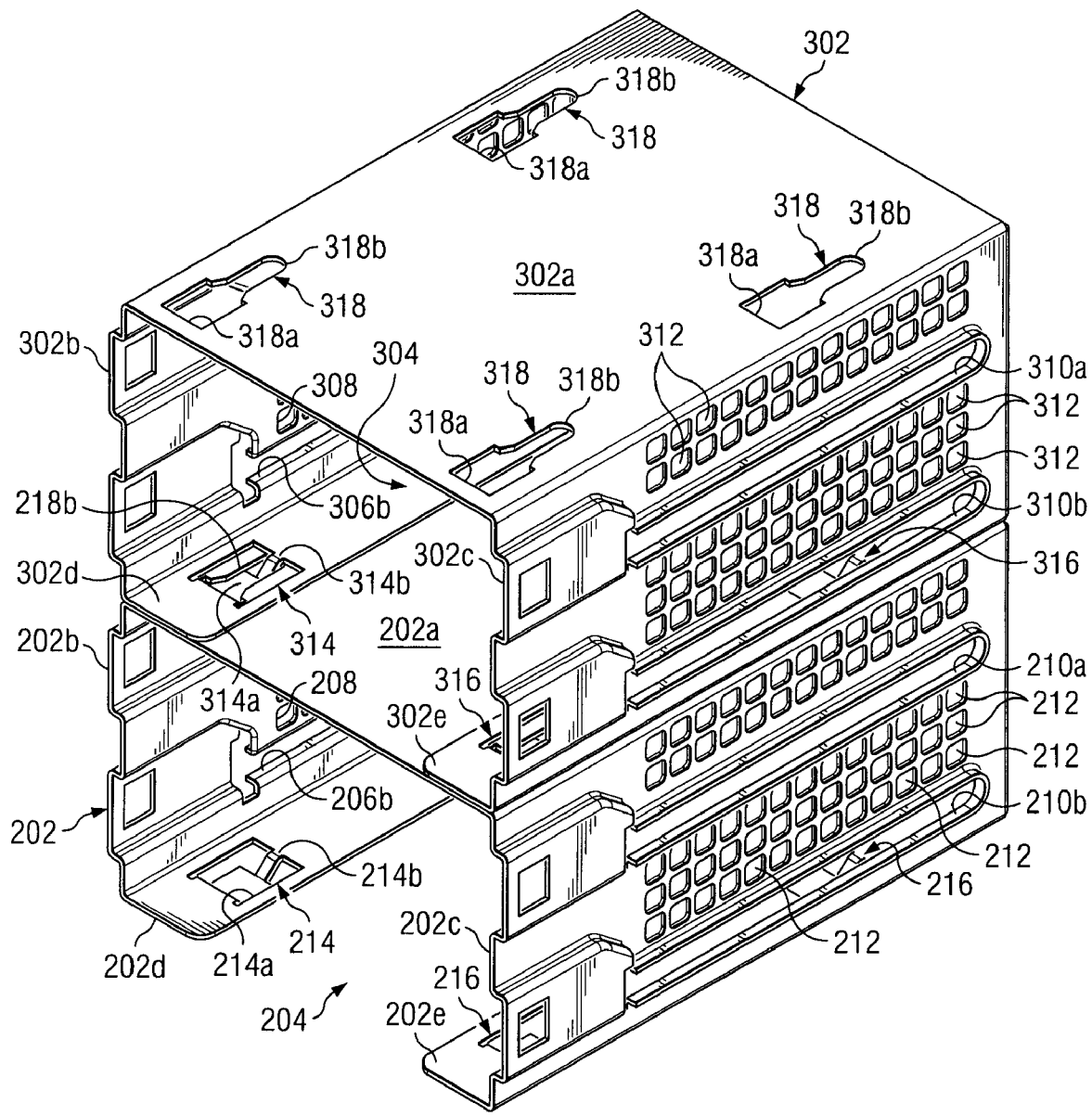
FIG. 6b is a perspective view illustrating an embodiment of the second component bay of FIGS. 3a and 3b coupled to the first component bay of FIGS. 2a and 2b.

Referring now to FIGS. 2a, 2b, 3a, 3b, 5, 6a and 6b, a method 600 for coupling a modular component to a chassis is illustrated. The method 600 begins at step 602 where an IHS chassis is provided. The IHS chassis 500, described above with reference to FIG. 5, is provided. The method 600 then proceeds to step 604 where the second component bay 300, described above with reference to FIGS. 3a and 3b, is coupled to the first component bay 200, described above with reference to FIGS. 2a and 2b. The second component bay 300 is positioned adjacent the first component bay 200 such that the bottom walls 302d and 302e on the second component bay 300 are located adjacent the top wall 202a on the first component bay 200 such that the securing members 314a and 316a on the second bay chassis coupling members 314 and 316, respectively, are located adjacent the locating apertures 218a on the first bay stacking members 218. The second component bay 300 is then moved towards the first component bay 200 such that the securing members 314a and 316a on the second bay chassis coupling members 314 and 316, respectively, extend through the locating apertures 218a on the first bay stacking members 218 and into the modular component housing 204. The second component bay 300 is then moved relative to the first component bay 200 such that the guide members 314b and 316b on the on the second bay chassis coupling members 314 and 316, respectively, enter the securing channels 218b on the first bay stacking members 218 and the securing members 314a and 316a on the second bay chassis coupling members 314 and 316, respectively, engage the top wall 202a to secure the second component bay 300 to the first component bay 200, as illustrated in FIG. 6b.

Figure 6C:
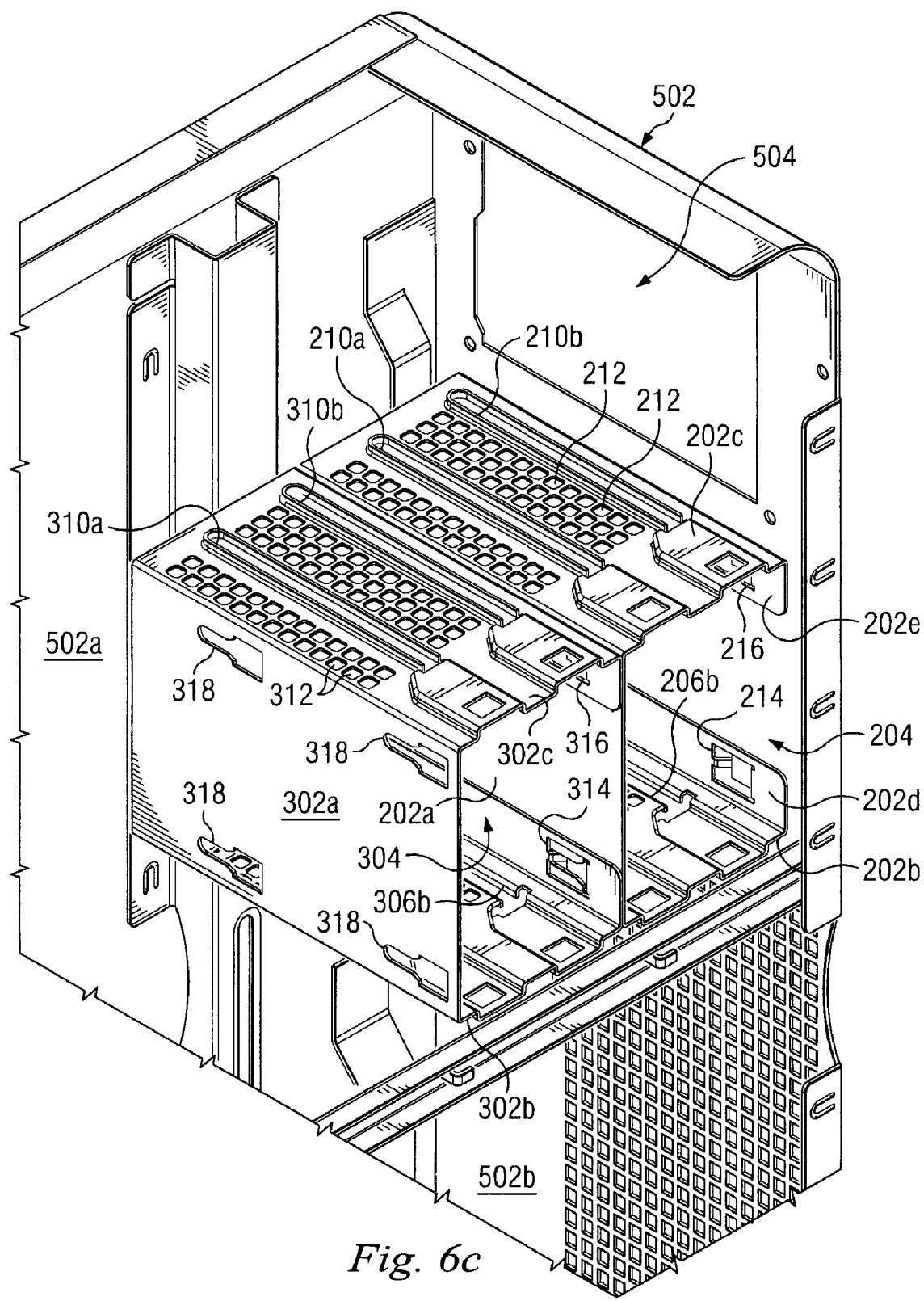
FIG. 6c is a perspective view illustrating an embodiment of the first component bay and the second component bay of FIG. 6b coupled to the IHS chassis of FIG. 5.

Referring now to FIGS. 2a, 2b, 3a, 3b, 5, 6a, 6b and 6c, the method 600 proceeds to step 606 where the first component bay 200, described above with reference to FIGS. 2a and 2b, is coupled to the IHS chassis 500, described above with reference to FIG. 5. The coupled together first component bay 200 and second component bay 300, illustrated in FIG. 6b, is positioned in the IHS housing 504 defined by the IHS chassis 500 such that the rear walls 202f and 202g on the first component bay 200 and the rear walls 302f and 302g on the second component bay 300 are located adjacent the side wall 502a on the IHS chassis 500 and the bottom walls 202d and 202e on the first component bay 200 are located adjacent the rear wall 502b on the IHS chassis 500 with the securing members 214a and 216a on the first bay chassis coupling members 214 and 216, respectively, located adjacent the locating apertures 508a on the bay coupling members 508. The first component bay 200 is then moved towards the rear wall 502b of the IHS chassis 500 such that the securing members 214a and 216a on the first bay chassis coupling members 214 and 216, respectively, extend through the locating apertures 508a on the bay coupling members 508. The first component bay 200 is then moved relative to the rear wall 502b of the IHS chassis 500 such that the guide members 214b and 216b on the on the first bay chassis coupling members 214 and 216, respectively, enter the securing channel 508b on the bay coupling members 508 and the securing members 214a and 216a on the first bay chassis coupling members 214 and 216, respectively, engage the rear wall 502b of the IHS chassis 500, as illustrated in FIG. 6c. In an embodiment, a plurality of fasteners (not shown) such as, for example, a screw, a nut and bolt, a rivet, and/or a variety of other fasteners known in the art, may be used to further secure the first component bay 200 and the second component bay 300 to the IHS chassis 500 by engaging the fasteners with the first bay securing members 220, the second bay securing members 320, and the securing apertures 506 defined by the side wall 502a of the IHS chassis 500. While the first component bay 200 and the second component bay 300 have been described as first being coupled together before being coupled to the IHS chassis 500, in an alternative embodiment, the first component bay 200 may be coupled to the IHS chassis 500 first, followed by the second component bay 300 being coupled to the first component bay 200 and the IHS chassis 500.

Figure 6D:
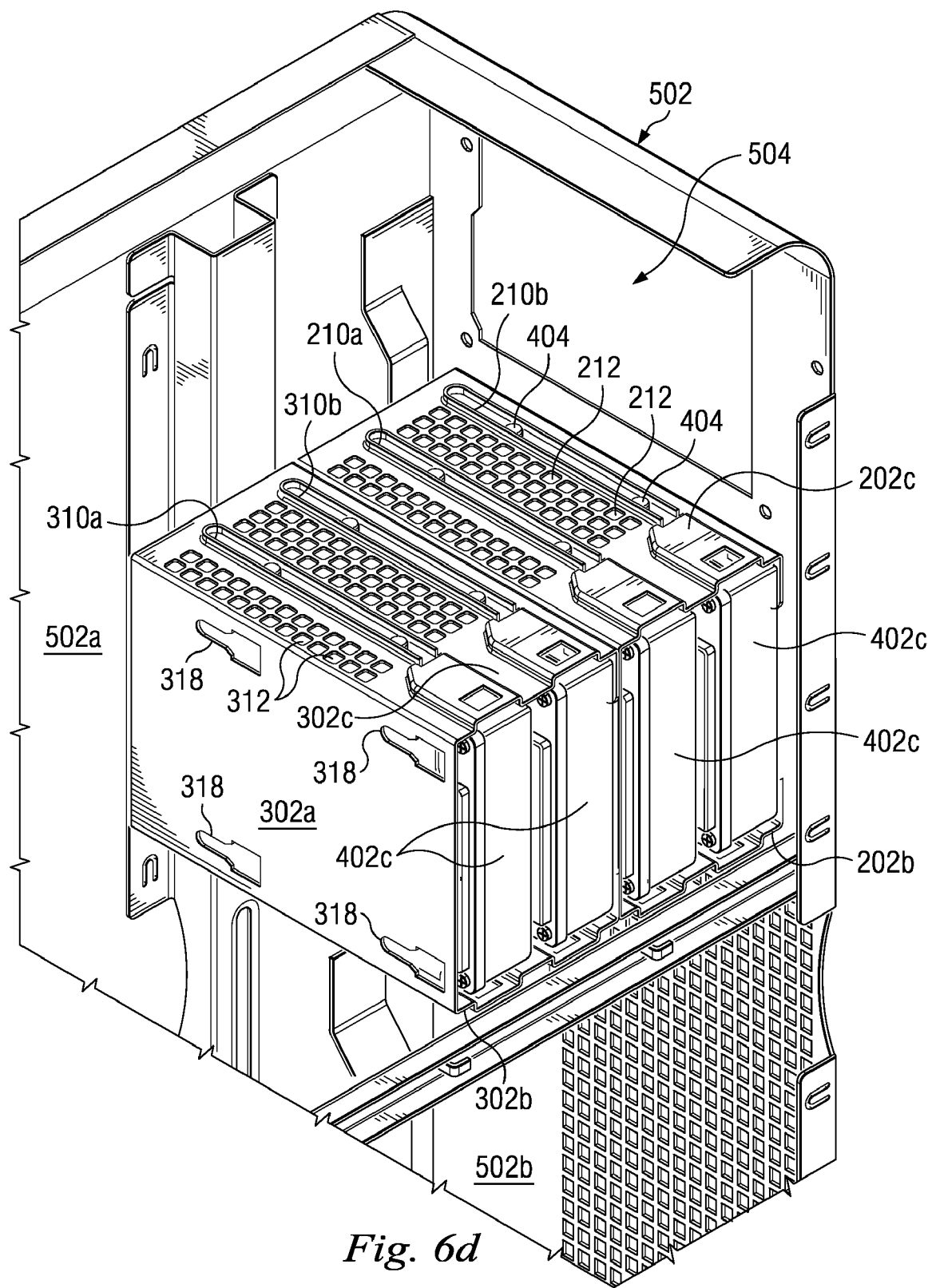
FIG. 6d is a perspective view illustrating an embodiment of the first component bay, the second component bay, and the IHS chassis of FIG. 6c with a plurality of the modular components of FIG. 4 housed in the first component bay and the second component bay.

Referring now to FIGS. 2a, 2b, 3a, 3b, 5, 6a, 6b, 6c and 6d, the method 600 proceeds to step 608 where a modular component is housed in the first component bay 200 and/or the second component bay 300. A plurality of modular components 400 may be housed in the modular component housings 204 and 304 defined by the first component bay 200 and the second component bay 300, respectively. For example, the modular component 400 is positioned adjacent the modular component housing 204 defined by the first component bay 200 such that the rear surface 402d on the modular component 400 is located adjacent the modular component housing 204 defined by the first component bay 200 with the guide members 404 on the modular component 400 aligned with the component channels 206b and 210b on the first component bay 200. The modular component 400 is then moved towards the first component bay 200 such that the modular component 400 enters the modular component housing 204 and the guide members 404 on the modular component 400 engage the component channels 206b and 210b on the first component bay 200. The modular component 400 may be moved through the modular component housing 204 until the IHS connector 406 on the modular component 400 engages a connector (not shown) on the IHS chassis 500 to electrically couple the modular component to a processor housed in the IHS chassis 500 such as, for example, the processor 102, described above with reference to FIG. 1. Additional modular components 400 may be housed in the first component bay 200 and the second component bay 300 in substantially the same manner as describe above, as illustrated in FIG. 6d. In an embodiment, the venting apertures 208 and 212 on the first component bay 200 and the venting apertures 308 and 312 on the second component bay 300 providing thermal cooling for the modular components 400. In an embodiment, additional components bays similar in design and operation to the first component bay 200 and the second component bay 300 may be added to the system and coupled to, for example, the second component bay 300 to provide additional housing for more modular components 400.

Figure 7:
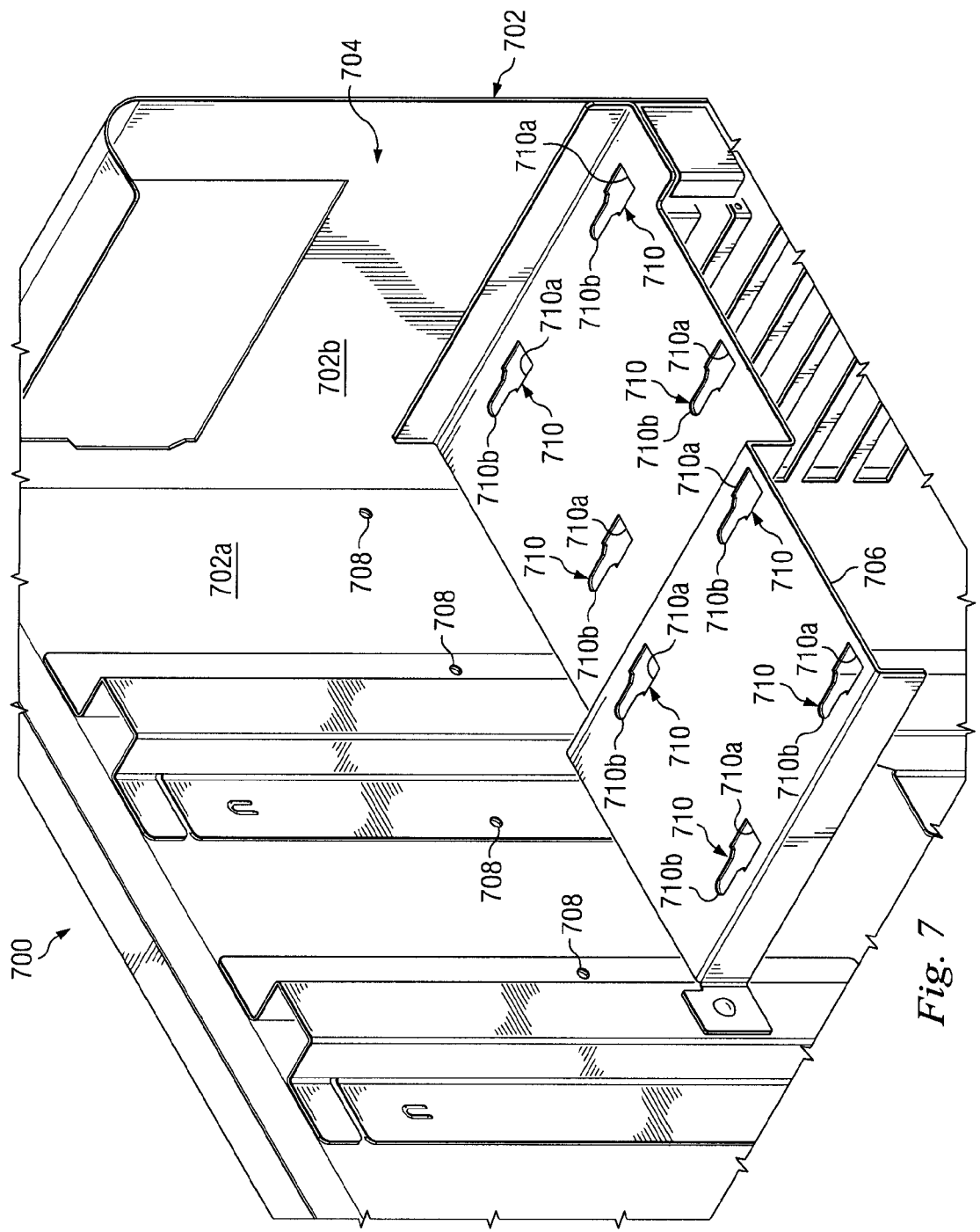
FIG. 7 is a perspective view illustrating an alternative embodiment of an IHS chassis used with the first component bay of FIGS. 2a and 2b, the second component bay of FIGS. 3a and 3b, and the modular component of FIG. 4.

Referring now to FIG. 7, in an embodiment, an IHS chassis 700 is illustrated. The IHS chassis 700 may be, for example, the chassis 116, described above with reference to FIG. 1, and may house some or all of the components of the IHS 100, described above with reference to FIG. 1. The IHS chassis 700 includes a base 702 having a side wall 702a and a rear wall 702b extending substantially perpendicularly from the side wall 702a. An IHS housing 704 is defined by the base 702 between the side wall 702a and the rear wall 702b. A support wall 706 extends between side wall 702a and the rear wall 702b and into the IHS housing 704. A plurality of securing apertures 708 are defined by the side wall 702a and located on the side wall 702a in a spaced apart orientation from each other. A plurality of bay coupling members 710 are located on the support wall 706 which, in the illustrated embodiment, each include a locating aperture 710a defined by the support wall 706 and a securing channel 710b defined by the support wall 706 and extending from the locating aperture 710a. In an embodiment, the IHS chassis 700 is a different chassis than the IHS chassis 500, described above with reference to FIG. 5. In an embodiment, the IHS chassis 700 is the IHS chassis 500 with the provision of the support wall 706.

Figure 8B:
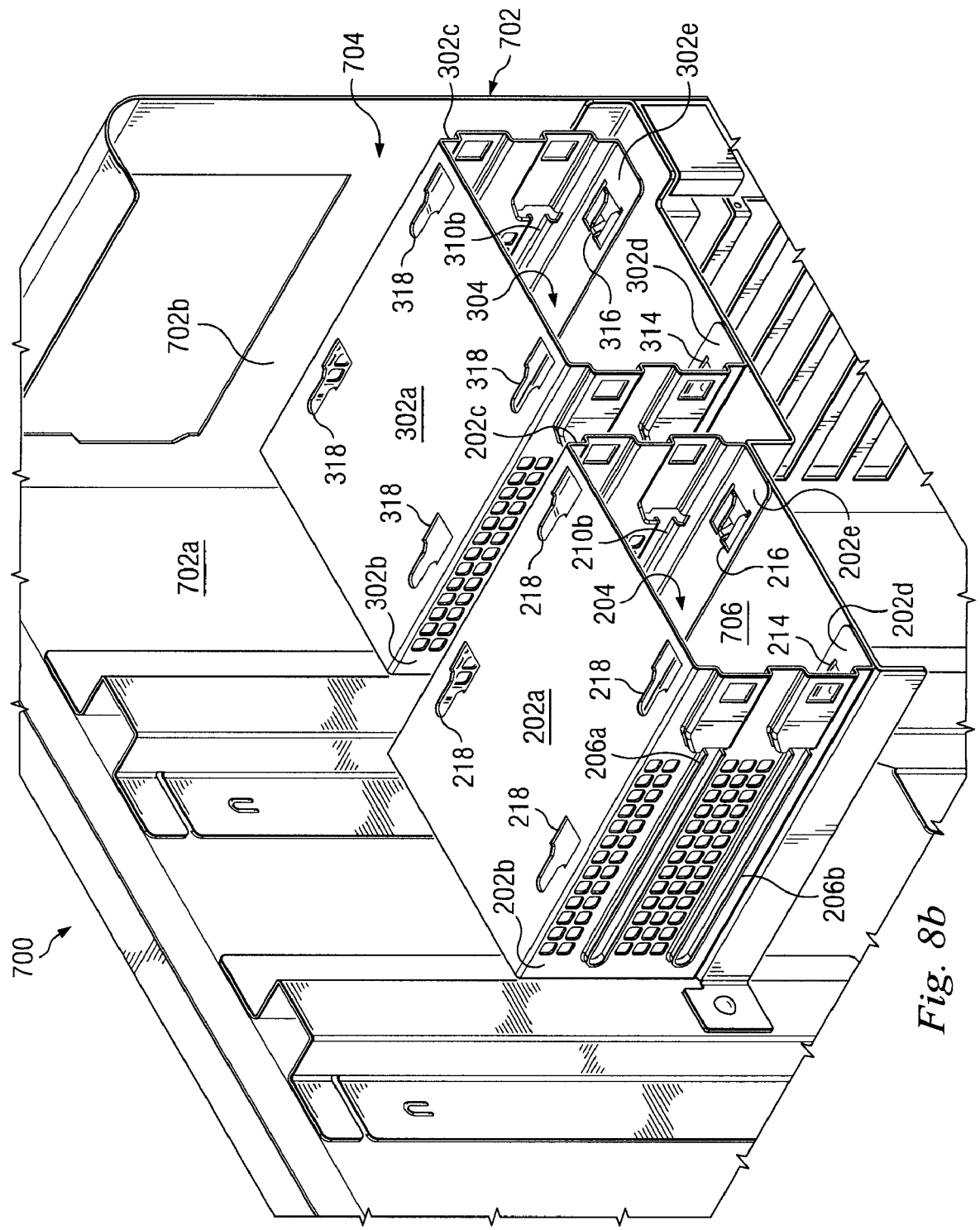
FIG. 8b is a perspective view illustrating an embodiment of the first component bay of FIGS. 2a and 2b and the second component bay of FIGS. 3a and 3b coupled to the IHS chassis of FIG. 7.

Referring now to FIGS. 2a, 2b, 3a, 3b, 7, 8a and 8b, a method 800 for coupling a modular component to a chassis is illustrated. The method 800 begins at step 802 where an IHS chassis is provided. The IHS chassis 700, described above with reference to FIG. 7, is provided. The method 800 then proceeds to step 804 where the first component bay 200, described above with reference to FIGS. 2a and 2b, and the second component bay 300, described above with reference to FIGS. 3a and 3b, are coupled to the IHS chassis 700, described above with reference to FIG. 7. The first component bay 200 is positioned in the IHS housing 704 defined by the IHS chassis 700 such that the rear walls 202f and 202g on the first component bay 200 are located adjacent the side wall 702a on the IHS chassis 700 and the bottom walls 202d and 202e on the first component bay 200 are located adjacent the support wall 706 on the IHS chassis 700 such that the securing members 214a and 216a on the first bay chassis coupling members 214 and 216, respectively, are located adjacent the locating apertures 710a on the bay coupling members 710. The first component bay 200 is then moved towards the support wall 706 of the IHS chassis 700 such that the securing members 214a and 216a on the first bay chassis coupling members 214 and 216, respectively, extend through the locating apertures 710a on the bay coupling members 710. The first component bay 200 is then moved relative to the support wall 706 of the IHS chassis 700 such that the guide members 214b and 216b on the on the first bay chassis coupling members 214 and 216, respectively, enter the securing channel 710b on the bay coupling members 710 and the securing members 214a and 216a on the first bay chassis coupling members 214 and 216, respectively, engage the support wall 706 of the IHS chassis 700, as illustrated in FIG. 8b. In an embodiment, a plurality of fasteners (not shown) such as, for example, a screw, a nut and bolt, a rivet, and/or a variety of other fasteners known in the art, may be used to further secure the first component bay 200 to the IHS chassis 700 by engaging the fasteners with the first bay securing members 220 and the securing apertures 708 defined by the side wall 702a of the IHS chassis 700. The second component bay 300 may be coupled to the IHS chassis 700 by engaging the second bay chassis securing members 314 and 316 on the second component bay 300 with the bay coupling members 710 defined by the support wall 706 in substantially the same manner as described above for the first bay component member 200, as illustrated in FIG. 8b.

Figure 8C:
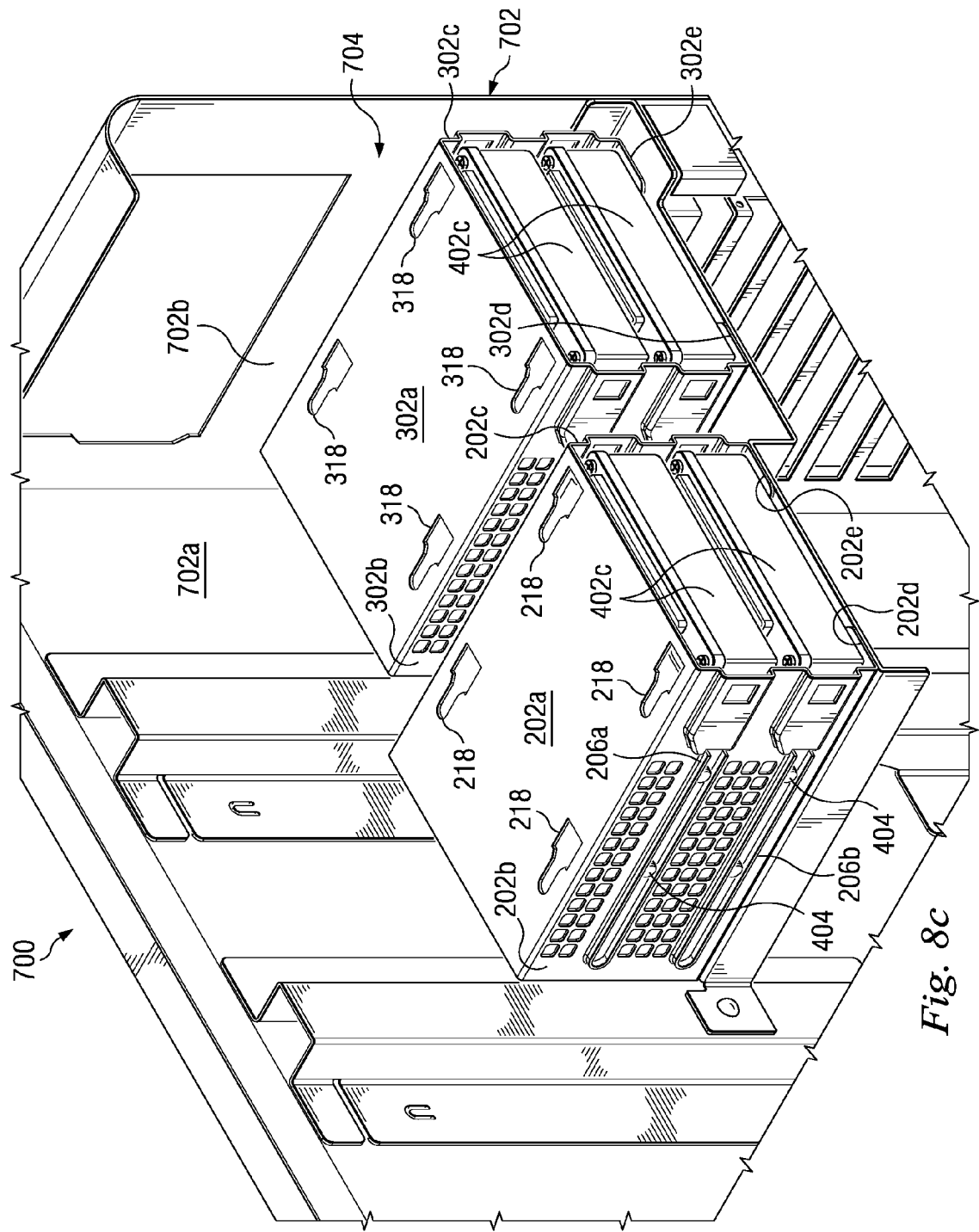
FIG. 8c is a perspective view illustrating an embodiment of the first component bay, the second component bay, and the IHS chassis of FIG. 8b with a plurality of the modular components of FIG. 4 housed in the first component bay and the second component bay.

Referring now to FIGS. 2a, 2b, 3a, 3b, 7, 8a, 8b and 8c, the method 800 proceeds to step 806 where a modular component is housed in the first component bay 200 and/or the second component bay 300. A plurality of modular components 400 may be housed in the modular component housings 204 and 304 defined by the first component bay 200 and the second component bay 300, respectively. For example, the modular component 400 is positioned adjacent the modular component housing 204 defined by the first component bay 200 such that the rear surface 402d on the modular component 400 is located adjacent the modular component housing 204 defined by the first component bay 200 with the guide members 404 on the modular component 400 aligned with the component channels 206b and 210b on the first component bay 200. The modular component 400 is then moved towards the first component bay 200 such that the modular component 400 enters the modular component housing 204 and the guide members 404 on the modular component 400 engage the component channels 206b and 210b on the first component bay 200. The modular component 400 may be moved through the modular component housing 204 until the IHS connector 406 on the modular component 400 engages a connector (not shown) on the IHS chassis 700 to electrically couple the modular component to a processor housed in the IHS chassis 500 such as, for example, the processor 102, described above with reference to FIG. 1. Additional modular components 400 may be housed in the first component bay 200 and the second component bay 300 in substantially the same manner as describe above, as illustrated in FIG. 8c. In an embodiment, the venting apertures 208 and 212 on the first component bay 200 and the venting apertures 308 and 312 on the second component bay 300 providing thermal cooling for the modular components 400. In an embodiment, additional component bays similar in design and operation to the first component bay 200 and the second component bay 300 may be added to the system and coupled to, for example, the first component bay 200 and/or the second component bay 300 to provide additional housing for more modular components 400. Thus, a component bay system is provided that includes a plurality of component bays that include features that allow the component bays to be used in different locations and orientations in a chassis or in a plurality of chassis, including a side-by-side orientation and a stacked orientation, such that the component bays may, for example, be used across different IHS platforms and/or easily reconfigured in a chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for alternate coupling of a modular component to a chassis, comprising:

providing a chassis including a chassis base having a plurality of chassis stacking members;

providing a first multiple component bay and a second multiple component bay identical to the first component bay, each bay including a plurality of component coupling members and component stacking members;

engaging the first component bay coupling members with the chassis stacking members;

engaging the second component bay coupling members with the first component bay stacking members, whereby the first and second component bays are mounted in the chassis in a first orientation;

removing the first and second component bays;

alternatively perpendicularly mounting a support wall to the base of the chassis, the support wall including a plurality of stacking members; and mounting the first and second multiple component bays on the support wall such that the component bays coupling members engage the support wall stacking members, whereby the bays are mounted in the chassis in a second orientation, perpendicular to the first orientation.

2. The method of claim 1 wherein each component bay includes a plurality of venting apertures.

3. A system for alternate coupling of a modular component to a chassis, comprising;

an information handling system chassis including a chassis base having a plurality of chassis stacking members;

a first multiple component bay and a second multiple component bay identical to the first multiple component bay, each bay including a plurality of component coupling members and component stacking members;

the first component bay coupling members being engaged with the chassis stacking members;

alternatively, the first and second component bays being removed, and a support wall being mounted perpendicularly to the base of the chassis, the support wall including a plurality of stacking members; and the first and second multiple component bays being remounted in the chassis on the support wall such that the component bays coupling members are engaged with the support wall stacking members, whereby the bays are mounted in the chassis in a second orientation, perpendicular to the first orientation.

4. The system of claim 3 wherein each component bay includes a plurality of venting apertures.

5. The system of claim 4 wherein information handling system components are mounted in the bays.

* * * * *